United States Patent Office 2,693,456
Patented Nov. 2, 1954

2,693,456

TREATMENT OF DIATOMACEOUS EARTH

John E. Fennell, Sparks, Nev., assignor to The Eagle-Picher Company, Cincinnati, Ohio, a corporation of Ohio No Drawing. Application September 11, 1950, Serial No. 184,349

5 Claims. (Cl. 252—449)

This invention relates to a process for treating diatomaceous earth to improve its filtering qualities and color. The principal objective of the invention has been to provide a simple and convenient method for calcining diatomaceous earth whereby crude diatomaceous earth may be endowed with filtering qualities equal to those displayed by highly refined diatomaceous filter aids which are now available at premium prices only.

Crude diatomaceous earth, as mined from natural deposits in various geographical areas, is contaminated with impurities and organic matter and is altogether too dense to serve as a filtering medium for most industrial purposes. It has been known for many years that calcination is capable of improving the porosity of the crude earth and thereby increasing its flow rate as a filter medium. More recently, calcination of the crude earth in the presence of a fluxing agent, such as sodium chloride, carbonate or silicate, has come to be used as the standard procedure in the preparation of diatomaceous earth of filter grade quality. In a conventional flux calcination procedure, the crude earth, mined in the form of lumps is first crushed or comminuted and dried to a moisture content of approximately 0–6%. The dried material, containing flux calcining agent is next charged into a calcining furnace where it is exposed to a temperature of approximately 1600° F. to 1800° F. This heat treatment causes a marked reduction in the density of the diatomaceous earth and an attendant increase in the porosity to liquids of the material. The moisture content of the furnace charge is usually less than 7% by weight, and the flux calcining agent usually constitutes approximately 6% by weight.

While such flux calcination is capable of conferring a substantial improvement in the quality of the crude product, careful selection of the crude product from the various natural deposits of diatomaceous earth is also requisite if a filtering medium of acceptable quality is to be produced. Chemically, diatomaceous earth is designated as hydrated, amorphous silica. Physically, however, it consists of particles comprising the skeletal remains of once living microscopic plant organisms. These skeletal particles vary widely in their shape, form and geometrical configuration, yet such factors play an important part in the ultimate filtering properties of the refined material. Crude diatomaceous earth from many natural deposits fundamentally is not adapted for the production of a filter grade finished product by means of the conventional flux calcination procedures which are now available. In fact, the deposits of diatomaceous earth which are inherently capable of producing the finest filter grade materials when subjected to the conventional classification and flux calcination treatments are very small in relation to the large deposits of diatomaceous earth existing in various geographical areas of the world. The producers of filter grade materials, therefore, are always careful to select only the choicest crude deposits, yet these deposits occur in only limited quantities. In view of such considerations, the price of the best grades of diatomaceous filter aid far exceeds the nominal costs incidental to the flux calcination treatment.

The principal objective of this invention has been to provide an improved calcination process which may be applied to crude diatomaceous earth selected from natural deposits with far less discrimination than heretofore has been necessary, and to provide a process by which finished products may be produced having filtering qualities and color possessed by only a small fraction of the carefully selected filter aids heretofore available. Otherwise expressed, the objective has been to provide a process by which high grade diatomaceous filtering materials may be produced from run-of-mine crude earth, or from crude earths which have not been selected carefully from chosen deposits of known high quality. In addition, the objective of the invention has been to provide a simple calcination process in which a substantial improvement in color occurs as an incident in the improvement in filtering qualities of the finished product.

This invention briefly is predicated upon the discovery and determination that such improvements in the filtering qualities and color of crude diatomaceous earth conveniently may be obtained by conducting calcination in the presence of a small quantity of fluxing agent, but in the presence of a large or substantial amount of water, for example, up to 40% to 50% by weight of the total material charged to the calcining furnace. As distinguished from the deliberate drying of diatomaceous earth prior to the calcination, which has been characteristic of past procedures, the present invention contemplates a process in which wet earth, or earth to which water has been added, is introduced into the hot calcination furnace so that the water will be present at the site of calcination in the furnace when the diatomaceous earth is subjected to the high temperatures which are maintained therein. This technique is capable of providing filter grade materials exhibiting flow rates comparable to those of the very finest grades of diatomaceous earth or filter aid produced today only by the most careful selection of high quality raw materials from the relatively limited deposits of such nature.

The chemical, or physico-chemical mechanism by which the added moisture is capable of providing the improved results cannot be explained from the evidence which is available at the present time. Presumably, the fluxing agent acts upon the diatomaceous earth in substantially the same manner as it has behaved in previous "dry" calcination methods. However, either the additional moisture confers greater activity upon the fluxing agent, or the moisture performs an independent function of its own to supplement that of the fluxing agent to bring about the net improvement. Indeed, the filtering quality of diatomaceous earth which has once been "dry" flux calcined may be appreciably increased when it is subjected to a successive wet calcination, as just described. In any event, however, the presence of the water during calcination exerts a pronounced effect in decreasing the density of the crude material, and a corresponding effect in increasing its porosity which is manifest as an increase in the flow rate at which liquids may be passed through a layer of it in a typical filtering operation.

In the practice of this invention, the amount of fluxing agent which is incorporated in the crude material may be similar to the amount commonly employed in the conventional dry calcination methods, the amount being, for example, from approximately 4% to 8% by weight of the crude earth as mined. In general, if the quantity is increased beyond approximately 8%, the improvement decreases out of proportion to the cost of the added material; in fact, as is well understood by those skilled in the art of dry calcination, too much fluxing agent is definitely disadvantageous in tending to cause sintering effects which, in turn, reduce porosity.

Both soda ash and sodium hydroxide have been found to produce satisfactory results as calcining agents adapted to be used in the practice of the invention. Sodium silicate and sodium chloride, which also have been used in past dry calcination methods, confer less benefits in the presence of substantial quantities of moisture than sodium carbonate or hydroxide, and therefore, are to be treated only as partial equivalents.

The water content of the crude earth, prior to calcination, desirably is within the range of approximately 20% to 50% by weight. As the water content is increased gradually from 20%, a progressive increase in flow rate of finished product is noted. However, the improvement in flow rate recedes rapidly when the water content substantially exceeds 50% and, in fact, the flow rate of diatomaceous earth calcined at an initial moisture content of 60% is poor.

The moisture content of the crude earth, as mined, may be within the range indicated, but if not, then water is added suitably to bring the moisture content to the desired level.

The filtering properties of diatomaceous earth are measured in terms of "flow rate", the flow rate of a given material being identified as the amount of liquid which may be passed through a filter bed of that material before it has ceased to be effective as a filter because of the clogging of its pores. In the tests employed to determine comparative flow rates of the diatomaceous earth materials produced in accordance with the present invention, a commercially available diatomaceous earth filter aid known to possess acceptable filtering qualities, and presently used in large quantities in industry, was selected as a standard. Diatomaceous earth, calcined at 50% moisture content with 6% fluxing agent (soda ash) in accordance with the present invention, exhibited flow rates 200% to 258% greater than the flow rate of the standard; at 40% moisture content prior to calcination, the present products exhibited flow rates 175% to 214% greater than the standard. By way of further comparison, the same crude diatomaceous earths dried to an initial moisture content of 0 to 3.2% by weight before calcination, with the same quantity of the same flux, possessed flow rates varying from 91% to 94% of the standard. Also, the same crude diatomaceous earth treated to contain a moisture content of approximately 60% prior to calcination, exhibited a flow rate varying from 74% to 81% of the standard. The latter results designate the sharp decrease in filtering quality attending the presence of excessive moisture during calcination.

Calcination is conducted at a suitable temperature and time sufficient to bring the initially moistened furnace charge to a state of incipient fusion, identifiable as the point which is reached just before the mass within the furnace begins to fuse or sinter. The time and temperature selected for calcination of a given diatomaceous earth will vary; thus, the percentage of fluxing agent added alters the temperature at which incipient fusion will occur, as do variations in the physical or chemical properties of the crude earth being treated. However, the over-all process of calcining diatomaceous earth has been practiced for many years, the controls to be exercised in respect to time and temperature in dry calcination methods are well understood by those who are skilled in the art, and those same controls may be employed in governing the process of calcination in accordance with the invention.

In general, by way of example but not by way of limitation, working with crude earths selected from deposits at Clark, Nevada, it has been determined that calcination suitably may be conducted at a temperature of approximately 1700° F. for a period of approximately one hour. In the calcinations which led to the results described in the preceding paragraphs, the amount of fluxing agent employed was 6% by weight of commercial soda ash containing 58% $Na_2O$.

While color of diatomaceous earth in and of itself has no virtue in relation to employment of the finished product as a filter aid material, still, whiteness of color is a commercial requisite and the improvement in whiteness, as provided by the present process is significant not only from the point of view of appearance, but in respect to those uses of diatomaceous earth, other than filtering, where color is an important consideration to the purchaser. The following data illustrates color improvement provided by the present process:

1. The color of the crude earth mined at Clark, Nevada, as measured on a General Electric Spectrophotometer at 457 millimicrons, was 65%.

2. Flux calcination of the same crude Clark earth, containing from 0 to 3.2% initial moisture content, i. e., dry calcination, yielded products exhibiting a color of 82% to 87%. Wet flux calcination of the same products, at moisture contents varying from 20% to 50%, yielded colors consistently averaging 88% to 90%.

It is to be observed that some deposits contain natural impurities in such quantities that undesirable color factors, notably iron, cannot be eliminated. If the color of the crude earth is too poor, or if the color imparting impurities are too high to begin with, then neither wet nor dry flux calcination can bring the finished product to an acceptable color standard.

In the practice of the invention, diatomaceous earth, as mined, is usually in the form of lumps. To prepare the raw product for subsequent treatment, it is preferable to comminute it suitably, as by passing it once through a Prater mill having a ⅟₃₂" screen. The initial moisture content of the crude material will always vary in accordance with climatic conditions just preceding the period when the earth was mined, as well as the depth from the surface of the strata from which the earth was taken. Thus, for instance, the earth at Clark, Nevada, averages about 30% water content and higher during wet months, while earths in other localities will sometimes average 35% to 45% water content.

Following comminution of the lumps, the natural milled crude earth is blended with fluxing agent, water being added if necessary to bring the water content into the range of approximately 20% to 50% by weight at the time the material is fed to the calcination furnace. Blending may be conducted by treating the crude material in any suitable manner, as by passing the crude earth once through a Raymond mill having a ⅛" screen. Water to be added may either be intimately mixed with the crude earth at the same time the fluxing agent is being blended with it, or preceding or succeeding such operation. As a further alternative, the fluxing agent may be dissolved in the water to be added and the aqueous solution of fluxing agent may be incorporated into the crude earth. Generally, it is desirable to subject the crude earth to no more agitation than is necessary, in order that physical disintegration of the diatom skeletons and the production of an excessive percentage of fines may be avoided. It is desirable, however, that the components be intermixed thoroughly in order to provide uniformity and intimacy of contact of the fluxing agent and the water with the particles of crude earth at the time of firing.

The composition is next charged to the calcining furnace in any suitable manner which, if desired, may follow conventional practices now prevailing in the industry. Even at a 50% initial moisture content crude diatomaceous earth exhibits a substantially dry, free-flowing appearance, and thus, it may be handled as though it were a dry comminuted solid. However, at the elevated temperatures which prevail during calcination, some of the water added is eliminated rapidly as water vapor and the sudden liberation of steam causes the furnace charge, in traversing the calcining furnace, to bubble or boil and appear as though it were a heavy slurry.

After calcination, the material is preferably milled, to suitable particle size, for example, by passing it over a Prater mill with a ⅟₄₀" screen, or through equivalent treatment, and the material is then classified by means of a Federal classifier or the like. In the tests leading to the data disclosed herein, the C fraction from the classifier has been the fraction evaluated for filtering qualities.

It is appreciated that the presence of moisture in a crude earth during calcination burdens the calcining furnace with additional demands for heat necessary to effect elimination of the moisture during the calcining operation. To that extent the process of the present invention involves a cost item which is over and above the cost of the heat required to effect the calcination alone. However, the cost of the additional heat is appreciably less than the costs which are incidental to selection, grading and maintenance of inventory supplies of selected crude earth, and the process enables high-grade filter materials to be made from crude earth supplies which are not especially adapted for such production by the methods now available. Moreover, in comparison with the conventional dry calcination processes wherein forced heat is employed to dry the crude earth prior to calcination, a credit in cost is obtained in favor of the present process through the elimination of this charge. In fact, from the results which have been now obtained, it is apparent that the step of drying before calcination actually sacrifices ultimate performance properties of any crude diatomaceous earth as a filter aid material.

Having described my invention, I claim:

1. The method of treating crude diatomaceous earth to improve its useful qualities, which method comprises calcining the crude diatomaceous earth in the presence of about 4 to 8% by weight of fluxing agent, and a substantial quantity of free water, not substantially exceeding 50% by weight, in admixture therein.

2. The method of improving the filtering qualities of diatomaceous earth, which method comprises subjecting the diatomaceous earth to a temperature sufficiently high to effect its calcination while the diatomaceous earth is in admixture with approximately 20 to 50% by weight of naturally adsorbed free water and approximately 4 to 8% by weight of a fluxing agent.

3. The method of improving the filtering qualities of diatomaceous earth, which method comprises subjecting the diatomaceous earth to a temperature sufficiently high to effect its calcination, while the diatomaceous earth is in intimate admixture with about 4 to 8% by weight of sodium carbonate as a fluxing agent and approximately 20 to 50% by weight of free water.

4. In the art of treating diatomaceous earth wherein it is flux calcined after being comminuted, the method which comprises conducting the flux calcination in the presence of approximately 20% to 50% by weight of free water which is in intimate admixture with the diatomaceous earth.

5. The process of treating diatomaceous earth which comprises comminuting the crude material to eliminate lumpy formations therein, adding water to the comminuted product in amount sufficient to provide a water content of approximately 20% to 50% by weight therein, and incorporating a small percentage of soda ash as a fluxing agent into the mixture, then promptly subjecting the mixture to a calcining temperature for a period of time sufficient to calcine the earth, thereby, to enable the water and fluxing agent to confer greater porosity upon the finished product that it otherwise would have.

References Cited in the file of this patent

UNITED STATES PATENTS

| Number | Name | Date |
|---|---|---|
| 1,966,362 | Stockton | July 10, 1934 |
| 1,966,363 | Stockton | July 10, 1934 |
| 1,970,280 | Cummins | Aug. 14, 1934 |

FOREIGN PATENTS

| Number | Country | Date |
|---|---|---|
| 445,776 | Great Britain | Apr. 15, 1936 |